US 8,606,895 B2
Dec. 10, 2013

(12) United States Patent
Kohavi et al.

(54) SEAMLESS INTEGRATION OF MULTIPLE COMPUTING ENVIRONMENTS

(75) Inventors: Ran Kohavi, Ramat-HaSharon (IL); Ran Oelgiesser, Tel-Aviv (IL); Yizhak Levy, Tel-Aviv (IL)

(73) Assignee: Kidaro (Israel) Ltd., Ramat-Gan (IL)

( * ) Notice: Subject to any disclaimer, the term of this patent is extended or adjusted under 35 U.S.C. 154(b) by 280 days.

(21) Appl. No.: 12/087,857

(22) PCT Filed: Jan. 17, 2007

(86) PCT No.: PCT/IL2007/000057
§ 371 (c)(1),
(2), (4) Date: Apr. 3, 2009

(87) PCT Pub. No.: WO2007/083299
PCT Pub. Date: Jul. 26, 2007

(65) Prior Publication Data
US 2009/0328033 A1    Dec. 31, 2009

Related U.S. Application Data

(60) Provisional application No. 60/759,032, filed on Jan. 17, 2006.

(51) Int. Cl.
G06F 15/16    (2006.01)
(52) U.S. Cl.
USPC ........... 709/223; 709/224; 709/227; 709/228; 709/229
(58) Field of Classification Search
USPC ................................ 709/223, 224
See application file for complete search history.

(56) References Cited

U.S. PATENT DOCUMENTS

| 5,812,843 A | 9/1998 | Yamazaki et al. |
| 6,131,096 A * | 10/2000 | Ng et al. ........................ 1/1 |
| 6,178,443 B1 * | 1/2001 | Lin ........................ 709/208 |

(Continued)

FOREIGN PATENT DOCUMENTS

| GB | 2 399 902 A | 9/2004 |
| JP | 11-328135 | 11/1999 |

(Continued)

OTHER PUBLICATIONS

Chen, R., "Running old programs in a virtual machine doesn't necessarily create a good user experience," blogs.msdn.com/oldnewthing/archive/2005/10/05/477317.aspx, Oct. 5, 2005, 10 pages.

*Primary Examiner* — Djenane Bayard
(74) *Attorney, Agent, or Firm* — Woodcock Washburn, LLP

(57) ABSTRACT

A unification system for integrating multiple computing environments, which are available for simultaneous use by a single user, into a base environment includes a unification supervisor and a plurality of agents, where each agent is associated with a respective computing environment. The unification supervisor monitors information received from the agents regarding the multiple computing environments, and performs centralized direction of the computing environments in accordance with the received information. The centralized direction serves to incorporate the other computing environments into the base environment, and may be guided by policies designed to provide the user with a unified environment. The unification supervisor also issues instructions to the various agents. Each of the agents provides information regarding a respective computing environment to the unification supervisor, and may also manage the respective computing environment as directed by the unification supervisor. The base environment is typically the user's endpoint work environment.

38 Claims, 10 Drawing Sheets

(56) References Cited

U.S. PATENT DOCUMENTS

| | | |
|---|---|---|
| 6,836,888 B1 | 12/2004 | Basu Anindya et al. |
| RE43,103 E | 1/2012 | Rozman et al. |
| 2002/0002673 A1 | 1/2002 | Narin |
| 2002/0059517 A1 | 5/2002 | Haviv et al. |
| 2003/0169305 A1 | 9/2003 | Hodges |
| 2006/0010433 A1 | 1/2006 | Neil |
| 2006/0041620 A1* | 2/2006 | Nandhra ................ 709/206 |
| 2006/0059253 A1* | 3/2006 | Goodman et al. ............ 709/223 |
| 2006/0136910 A1 | 6/2006 | Brickell et al. |
| 2006/0136911 A1 | 6/2006 | Robinson et al. |
| 2006/0136912 A1 | 6/2006 | Robinson et al. |
| 2010/0058190 A1* | 3/2010 | Hodgson ................... 715/735 |

FOREIGN PATENT DOCUMENTS

| | | |
|---|---|---|
| JP | 11-338810 | 12/1999 |
| JP | 2004-528609 A | 9/2004 |
| WO | WO 01/09838 A1 | 2/2001 |
| WO | WO 2007/083300 | 7/2007 |

* cited by examiner

SEAMLESS INTEGRATION OF MULTIPLE COMPUTING ENVIRONMENTS

RELATED APPLICATIONS

This Application is a National Phase of PCT Patent Application No. PCT/IL2007/000057 having International filing date of Jan. 17, 2007, which claims the benefit of U.S. Provisional Patent Application No. 60/759,032 filed on Jan. 17, 2006. The contents of the above Applications are all incorporated herein by reference.

FIELD AND BACKGROUND OF THE INVENTION

The present invention relates to providing a user working in multiple computing environments with a single, unified environment, and more particularly but not exclusively to the seamless integration of multiple computing environments in an information technology (IT) infrastructure.

The growing complexity and variations in the deployment of computing environments in the modern IT infrastructure have created the need to enable a single user to work concurrently in multiple computing environments, each having different characteristics.

Examples of working within multiple computing environments include:

1. The simultaneous use of applications running on different operating systems (such as Windows and Unix) or a different version of the same operating system (such as Windows 95 and Windows XP).
2. The simultaneous use of applications that cannot coexist on the same environment, for instance because they use different versions of shared libraries (e.g. DLLs).
3. The need for backward compatibility, for example to enable users to run several versions of the same application for purposes such as accessing content produced by previous versions of the application.
4. The need to access legacy environments such as mainframe applications.
5. The simultaneous use of applications running on different environments, or even different computer networks or infrastructures. For example, agents and resellers who need to access the computing environments of more than one vendor or service provider, employees of organizations that went through merge or acquisition, remote users such as sales persons who need to connect the Internet and the corporate network.
6. Securing a computing environment and network resources against external security threats.
7. Regulatory or business requirements to separate environments that contain regulated data from other environments, and specifically from outward facing environments such as the Internet.
8. Creating greater overall stability by separating stable and unstable environments. For example, in order to allow employees to use an unmanaged home PC to access the organization's resources, or to allow employees to create an environment where they can install evaluate and use unmanaged and personal applications.

Addressing these needs in a manner that suits day-to-day use requires a solution that maintains isolation between the various environments. This prevents the computing environments from posing security and stability risks to one another and to avoid unauthorized access to data. However, real environment isolation based on physical separation between computers and networks results in a poor user experience, sometimes preventing essential business data transfer, and immensely complicating operations and workflow.

It is therefore a requisite of any solution designed for day-to-day use to create a user experience which is as smooth and transparent as possible, thus reducing the inconvenience and amount of training needed for the user to operate simultaneously within multiple computing environments and simplifying day-to-day use, minimizing human errors, and reducing support calls.

Several existing solutions address the problem by providing a limited solution to one or more of the issues discussed above.

When approaching environment isolation, virtual machines (such as VMWare and Microsoft virtual PC) and remote desktop technologies (such as terminal services and Citrix) provide a means for creating an isolated environment, either on top of the existing user host or by accessing a physically separated environment within a server.

Both solutions allow a single user to work on other environments in addition to his host environment, while providing separation between the environments (i.e. preventing data from entering or leaving the environment), thus ensuring the environment is truly isolated.

One shortcoming of these approaches is that data transfer is sometimes required, as most users rely on transferring data between the various applications they simultaneously use to perform day-to-day business activities. There are currently two main approaches to transferring data between environments:

1. Complete separation, with no connectivity or data transfer, usually resulting in user inconvenience.
2. Enabling certain data transfers like clipboard operations, drag-n-drop or sharing certain file locations. However, once enabled the environments are exposed to security risks from one another.

Currently, only a limited number of applications, such as Citrix Presentation Server and some add-ons for Terminal Services, combine the local and remote windows into a single desktop environment by providing seamless windows integration, allowing clipboard integration, and so forth. However, these solutions do not address all issues relating to computing environment unification, such as synchronizing environments and user settings, sharing printers, incorporating user access to applications running on different environment, in a manner that is transparent to the user. Additionally, these solutions are not available for virtualized platforms (e.g. VMWare and Microsoft Virtual PC).

An additional issue that must be addressed in order to provide a comfortable user experience is the method by which one of the computing environments is chosen for a given user operation. The most common approach today is to require the user to manually choose an environment. This may cause human mistakes and inconvenience.

An alternate approach for selecting a current computing environment (implemented for instance in Citrix Presentation Server) creates a mechanism which allows an administrator to choose whether specific application or data type are processed locally or on the remote computer. However this approach does not allow granular decisions on a per file basis, such as based on the file's originating environment.

A different important scenario for computing environment unification is a system constellation in which one or more of the computing environments are virtual environments. A discussion of the limitations of current attempts to integrate virtual machines into a single user environment is found in the article by Raymond Chen entitled "Running old programs in a virtual machine doesn't necessarily create a good user experience", at blogs.msdn.com/oldnewthing/archive/2005/10/05/477317.aspx. Problems cited with current solutions include:

1. The user must manually start and/or log on to each of the computing environments.
2. In order to operate applications on multiple computing environments, the user must manually move between the different environments.
3. Separate task bars for each environment
4. Problematic data transfer between environments
5. Different keyboard controls for each environment In the virtualized environment use case, patent applications 20060136910, 20060136911 and 20060136912 suggest a concept of allowing access to several virtual environments, potentially running on the same user machine, using a unification console. However, these approaches do not apply the case where one of the computing environments the user's host environment or a remote desktop.

Thus, none of the currently available approaches provides a solution which is appropriate for a diverse user environment, which may include virtual machines, the user's host machine, and/or remote desktops. Furthermore, none of the existing solutions succeeds in unifying all aspects of the user's experience in a transparent manner and without inconveniencing the user.

There is a need for a secure solution which can provide a smooth user experience (similar to that of a single environment) regardless of the underlying platforms (such as virtual machines or remote desktops) or operating systems. The solution should include improved control of data transfer between computing environments and better methods for selecting a computing environment for a given operation.

There is thus a widely recognized need for, and it would be highly advantageous to have, a system and method for integrating multiple computing environments into a unified environment devoid of the above limitations.

SUMMARY OF THE INVENTION

According to a first aspect of the present invention there is provided a unification system for integrating multiple computing environments, which are available for simultaneous use by a single user, into a base environment. The unification system includes a unification supervisor and a plurality of agents, where each agent is associated with a respective computing environment. The unification supervisor monitors information received from the agents regarding the multiple computing environments, and performs centralized direction of the computing environments in accordance with the received information. The centralized direction serves to incorporate the other computing environments into the base environment, and may be guided by policies designed to provide the user with a unified environment. The unification supervisor also issues instructions to the various agents. Each of the agents provides information regarding a respective computing environment to the unification supervisor, and may also manage the respective computing environment as directed by the unification supervisor.

According to a second aspect of the present invention there is provided a method for integrating multiple computing environments into a single unified environment. The multiple computing environments are available for simultaneous use by a single user, and one of the multiple environments comprises a user base environment. The method includes the steps of monitoring information received from each of the computing environments regarding an ongoing status of the respective computing environment, and performing centralized direction of the multiple computing environments in accordance with the received information so as to incorporate computing environments other than the base environment into the base environment. A unified work environment is thereby provided to the user.

According to a third aspect of the present invention there is provided an agent for placing in a computing environment. The agent includes an information gatherer, which gathers information regarding an ongoing status of the computing environment, and an information provider which outputs the gathered information. The information is gathered and provided in a manner that allows the computing environment to interact with a unification system for incorporating multiple computing environments into a user base environment.

The present invention successfully addresses the shortcomings of the presently known configurations by performing policy-based centralized integration of multiple computing environments into the user's base environment, based on information provided by agents associated with each of the different computing environments.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
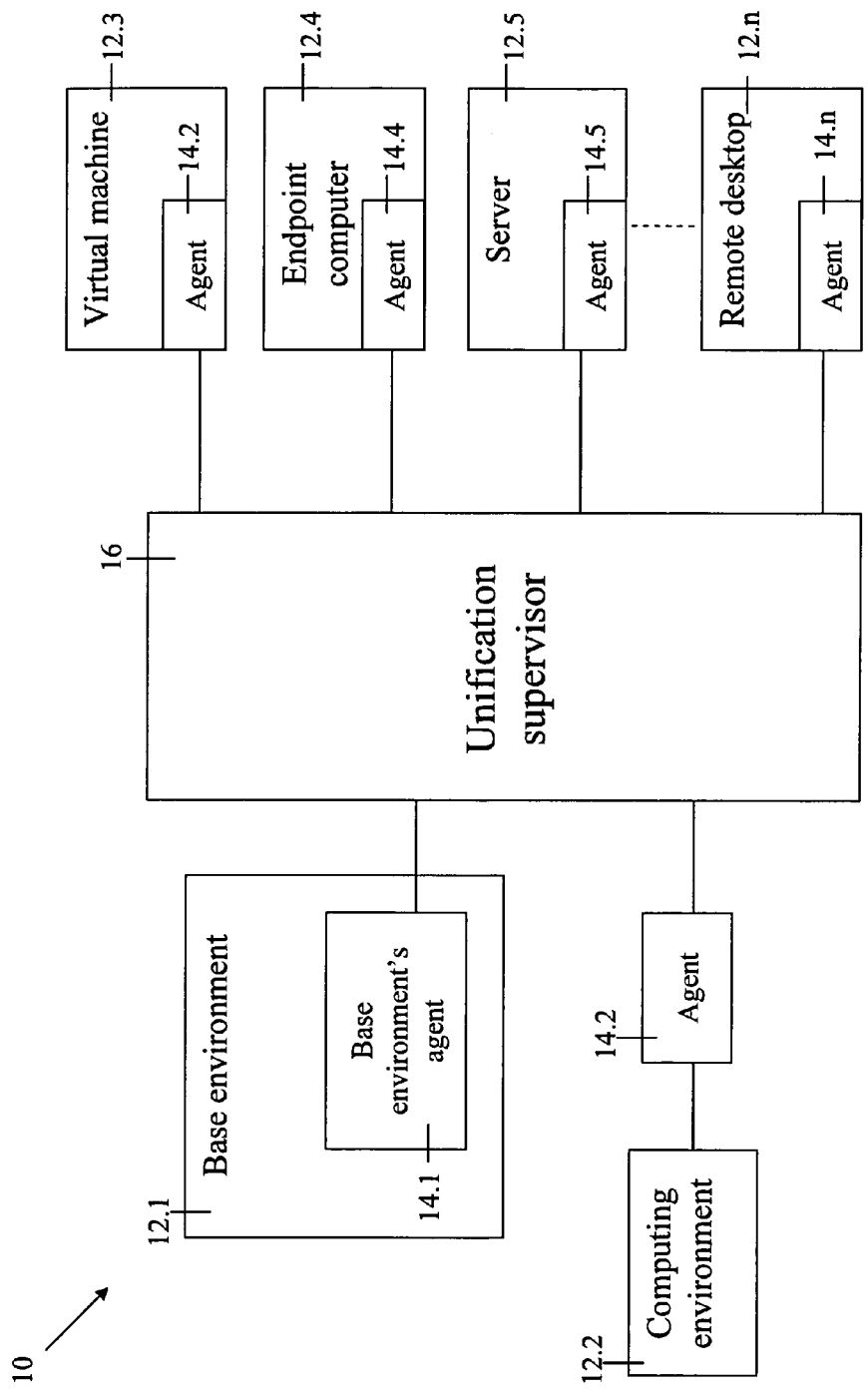
FIG. 1 is a simplified block diagram of a unification system for integrating multiple computing environments into a single unified environment, according to a preferred embodiment of the present invention.

The present embodiments are of a system and method for integrating multiple computing environments into a unified environment. Specifically, a unified environment is created in which the user need not be aware of the particular environment in which an application, resource or file resides in order to work with that application, resource or file. The user works with a desktop containing the active windows of all the computing environments with control and synchronized settings. A policy (possibly composed of a file permissions policy, a network access policy, and others) is applied to ensure that the security of each of the computing environments is not compromised by access or data transfer from other environments.

As established above, a system is needed that incorporates the requirements of isolation and a transparent user experience, and enables day-to-day use of multiple computing environments, including multiple operating system instances on top of a standard computing environment technology (such as a virtual machine or a remote desktop).

The present embodiments describe a system and method for computing environment integration that is based on a centralized unification supervisor which communicates with agents installed on each of the environments. The agents provide the supervisor with the information required to integrate all aspects of the user experience, including providing a unified file system, enabling data transfer between environments, controlling resource access, uniform keyboard controls, enable application execution, and more. The supervisor uses the provided information to integrate the various environments in accordance with defined policies, and controls the various environments via their respective agents. A base environment is selected from amongst the multiple computing environments, typically the user's physical work environment, and the supervisor uses the provided information to integrate the other computing environments into the base environment. The integration may be guided by policies defined by a user or administrator, so as to tailor the unified environment to the needs of a particular user or organization.

Each aspect of the unification may be implemented by a separate component within the supervisor, so that the capabilities of the supervisor may be tailored to the user needs simply by including the necessary components.

The user may thus work as if within a single computing environment, even though files are being accessed and applications are being run on multiple computing environments, each with its own constraints and requirements.

It is to be understood that the present embodiments may be implemented on any form of multiple computing environments, regardless of the platform that is used in order to create them (such as virtual machines and remote desktop technologies), and of the operating system in use (such as Windows, Linux, etc).

The principles and operation of a unification system and method according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In the following, parts that are the same as those in previous figures are given the same reference numerals and are not described again except as necessary for an understanding of the present embodiment.

Reference is now made to FIG. 1, which is a simplified block diagram of a unification system for integrating multiple computing environments into a base environment, according to a preferred embodiment of the present invention. Unification system 10 integrates multiple computing environments 12.1-12.n, which are available for simultaneous use by a single user, into a base environment 12.1. Integration is performed while enforcing the individual requirements and constraints of each computing environment, and without compromising the security of any of the individual computing environments. All aspects of the computing environments may be effectively unified, including visual integration of the desktop and task bar, a unified file system, application execution, and more. Thus the user is provided with a comfortable work environment while the integrity of the individual computing environments is maintained.

In the preferred embodiment, one of the computing environments is selected as a base environment 12.1, and its agent is selected as the base environment agent 14.1. Unification supervisor 16 incorporates the remaining computing environments into base environment 12.1. (In the following the concept of incorporating a computing environment into the base environment is also referred to as integrating the computing environments.) Typically, the user's endpoint work computer is selected as the base environment. Base environment 12.1 establishes the user environment (in terms of settings, preferences, and so forth) and the base user desktop (in terms of controls, interfaces and input) into which the remaining computing environments 12.2-12.*n* are to be integrated. It is therefore not necessary for the user to actively define a set of preferences, settings and so forth, for the unified environment; the integration process is completely transparent to the user. Base environment 12.1 also establishes the base file system, as discussed in the context of the file system unifier below.

Each computing environment 12.*x* is associated with an agent 14.*x*, which communicates with unification supervisor 16. The agent is preferably resident within the computing environment (as for computing environment 12.1). Each agent 12.*x* provides unification supervisor with information about the associated computing environment 12.*x*. This information may include user input, application attributes, system attributes, and so forth. Unification supervisor 16 receives the information from the base environment agent 14.1 and the rest of the agents 14.2-14.*n*, performs centralized direction of the multiple computing environments, and issues instructions to base environment 12.1 and agents 14.2-14.*n* accordingly. The centralized direction is performed in accordance with the received information, and incorporates the other computing environments 12.2-12.*n* into base environment 12.1.

The unification process may be guided by a defined policy that establishes the measure of unification or isolation that is maintained between the said computing environments, and allows the unification to be tailored to the specific system constellation and to user needs. Integration may be performed to any degree of stringency required by the user. For example, the user may be given unrestricted access to the base file system (which incorporates all of the file systems of the multiple computing environments, as described below). Alternately, different permissions may be applied for different computing environments. Unification supervisor 16 may be a stand-alone component of the system, or may be resident on one of the computing environments, preferably the base environment. The operation of unification supervisor 16 is described in detail below.

In addition, each agent 14.*x* preferably manages the respective computing environment as directed by the instructions issued by unification supervisor 16. Thus a system is formed in which unification supervisor 16 is able to coordinate the resources and operations of all of the computing environments in a centralized manner, effectively creating a single unified environment for the user.

It is to be understood that FIG. 1 illustrates a non-limiting exemplary system. The number and nature of the computing environments and their agents may differ from that shown.

Examples of different types of computing environments 12.*x* include:
  a. Virtual machine (also denoted herein a virtual environment) 12.3
  b. Endpoint computer 12.4
  c. Server 12.5
  d. Remote desktop 12.*n*

The various computing environments may all run the same operating system. Alternately, the operating system may not be the same for all of the computing environments. This enables a user to work with applications which run on different operating systems, such as legacy application which require a previous version of the operating system.

Some or all of the computing environments may be connected by a data network. Thus the user may be simultaneously working on a personal computer (PC), running a virtual machine on the PC, and communicating with a server over a network.

In the preferred embodiment, data may be tagged by unification supervisor 16 and/or an agent 14.*x*. The tag assists in the enforcement of the policies by the unification supervisor, and enables further control of the operations this data unit undergoes. The tag may include metadata such as the computing environment on which the data was created or last modified, the owner/modifier of the data, the source of the data unit if originated out of the computing environment (e.g. email, instant messaging, and device). For files the metadata may also include a list of changes to the file or its path. Data units may be visually marked (e.g. icon overlay over existing icon) according to their metadata. In addition, files can be transformed automatically (e.g. encrypted) according to their metadata.

Figure 2:
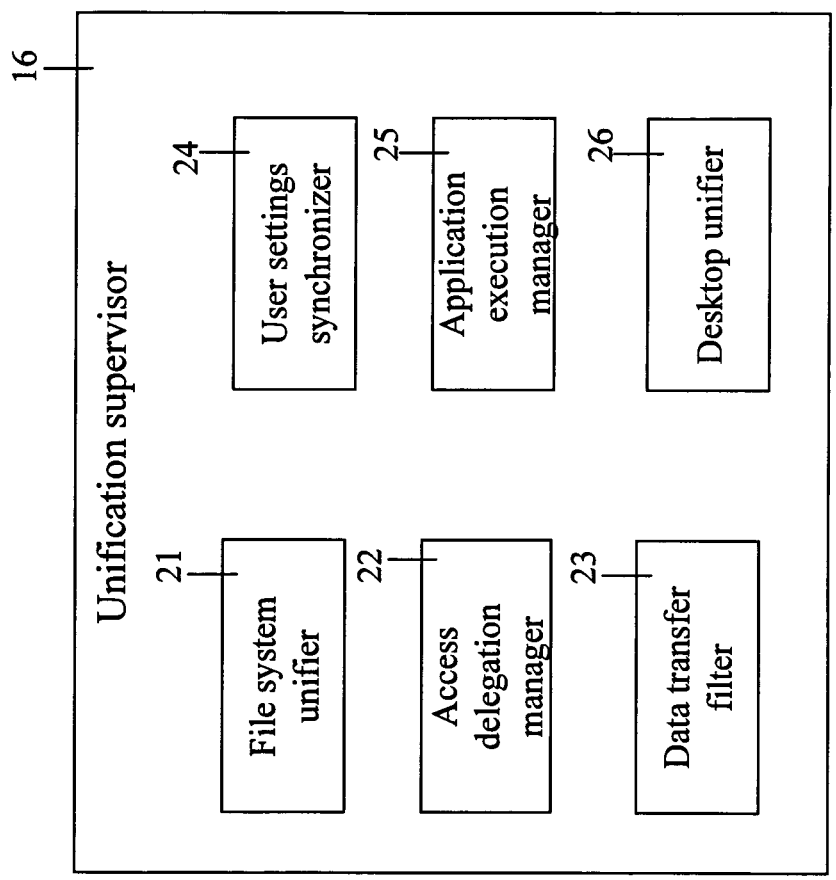
FIG. 2 is a simplified block diagram of a unification supervisor, according to a preferred embodiment of the present invention.

Reference is now made to FIG. 2, which is a simplified block diagram of a unification supervisor, according to a preferred embodiment of the present invention. Unification supervisor 16 preferably includes one or more of the following components:
  a. File system unifier 21
  b. Access delegation manager 22
  c. Data transfer filter 23
  d. User settings synchronizer 24
  e. Application execution manager 25
  f. Desktop unifier 26

Each of the listed components is described in detail below.

Figure 3:
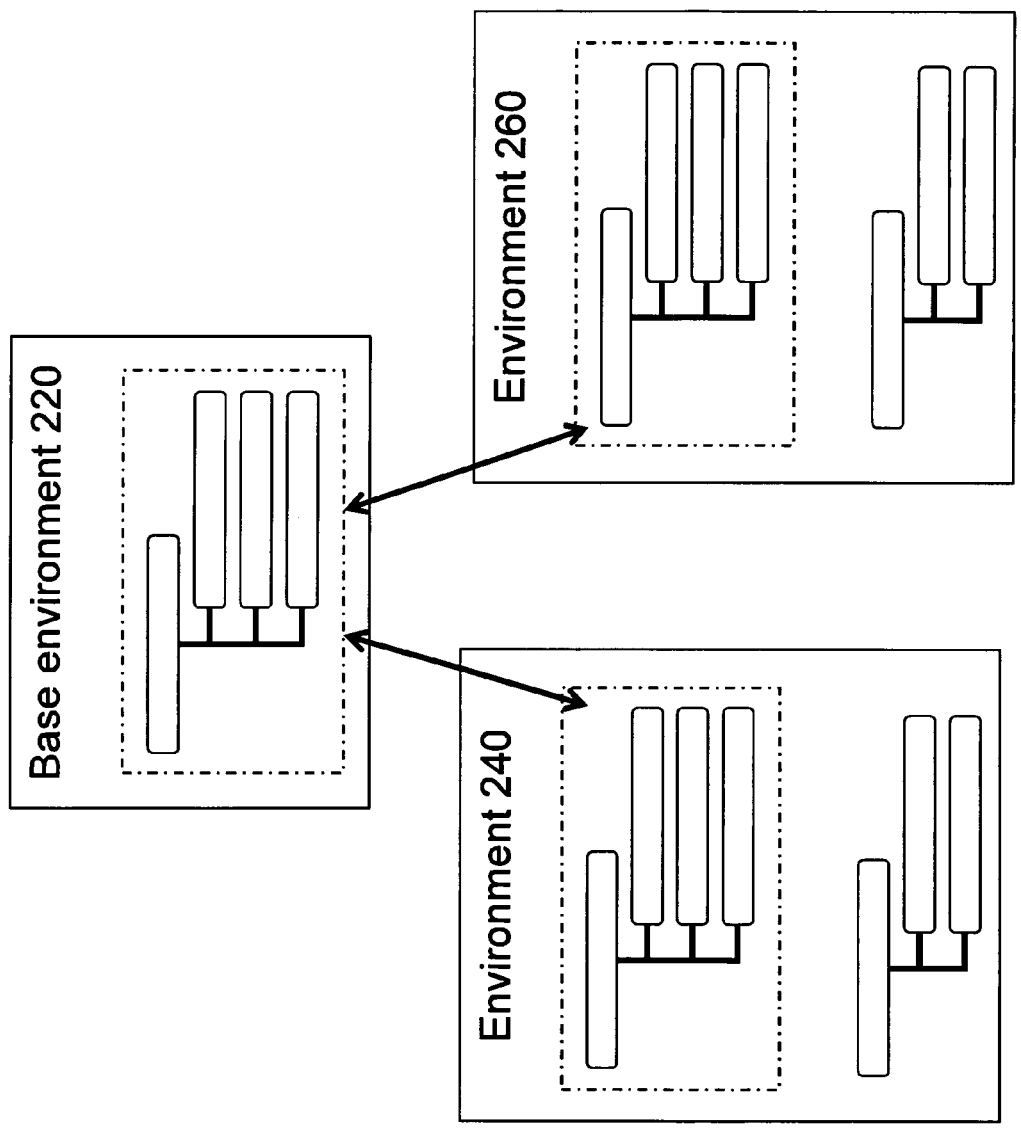
FIG. 3 is a simplified block diagram of a unified file system, according to a preferred embodiment of the present invention.

Reference is now made to FIG. 3, which is a simplified block diagram of an exemplary embodiment of a unified file system, according to a preferred embodiment of the present invention. File system unifier 21 creates a unified file system, which provides the user with a look and feel of a unified file system, across multiple computing environments (including uniform file paths, names, etc) even though each environment might have its own file system. The unified file system may be accessed by all of the user's computing environments, thus creating a smoother user experience.

File system unifier 21 sets the base environment's file system as the base file system, making it accessible to all other environments 240 and 260, preferably subject to a permissions policy enforced by the unification supervisor. Then, selected file access operations triggered by environments 240 and 260 on their local file system are monitored and reflected in the base file system. In this way, all of the computing environments may access the base file system as if it were their local file system, in addition to accessing their local file system. All of the computing environments are able to browse, read, write and delete files, access network folders and removable media that are accessible from within the base file system. In addition, the file names and paths may be uniform for all of the computing environments. Alternately, the file names and paths may be different in the various computing environments (e.g. a certain folder in one of the environment 240 or 260 may be redirected to a different folder in the base file system). Any change to a file name or path is immediately reflected in all other environments.

Use of the unified file system is preferably restricted by a permissions policy, thus preventing mutual exposure to security risks or unauthorized access between environments. Each of the environments 220, 240 and 260 may be assigned an individual policy, to allow or block browsing, reading, writing and deleting files of the unified file system. The permissions policy may also require transforming the files that are written or read by any of the environments. Permissions may be determined by parameters including the user, the user affiliation, file type, folder, drive type, path, user, the environment the file was created or last modified, and a tag (with file metadata).

File system unifier 21 may also include a file transformer, which transforms the files that are written or read from the base file system by any of the environments, as specified by the permission policy. Permissions may be determined by the environment the file was created or last modified, the user itself, the file type, file location, and any other metadata that was attached to the file (i.e. tag). For example, any file written to the base file system by a different one of the different environments 240 and 260, may be encrypted with an encryption key associated with this environment to enforce policy and allow future access only by the same computing environment.

Thus the user works with one file system, but the individual access requirements of each of the separate computing environments are still enforced. A flexible and granular permissions policy may be defined, which provides greater control over file access than is currently available for a standard file system. Different file permissions for a given file, based on the computing environment the user is using to perform the file operation.

Figure 4:
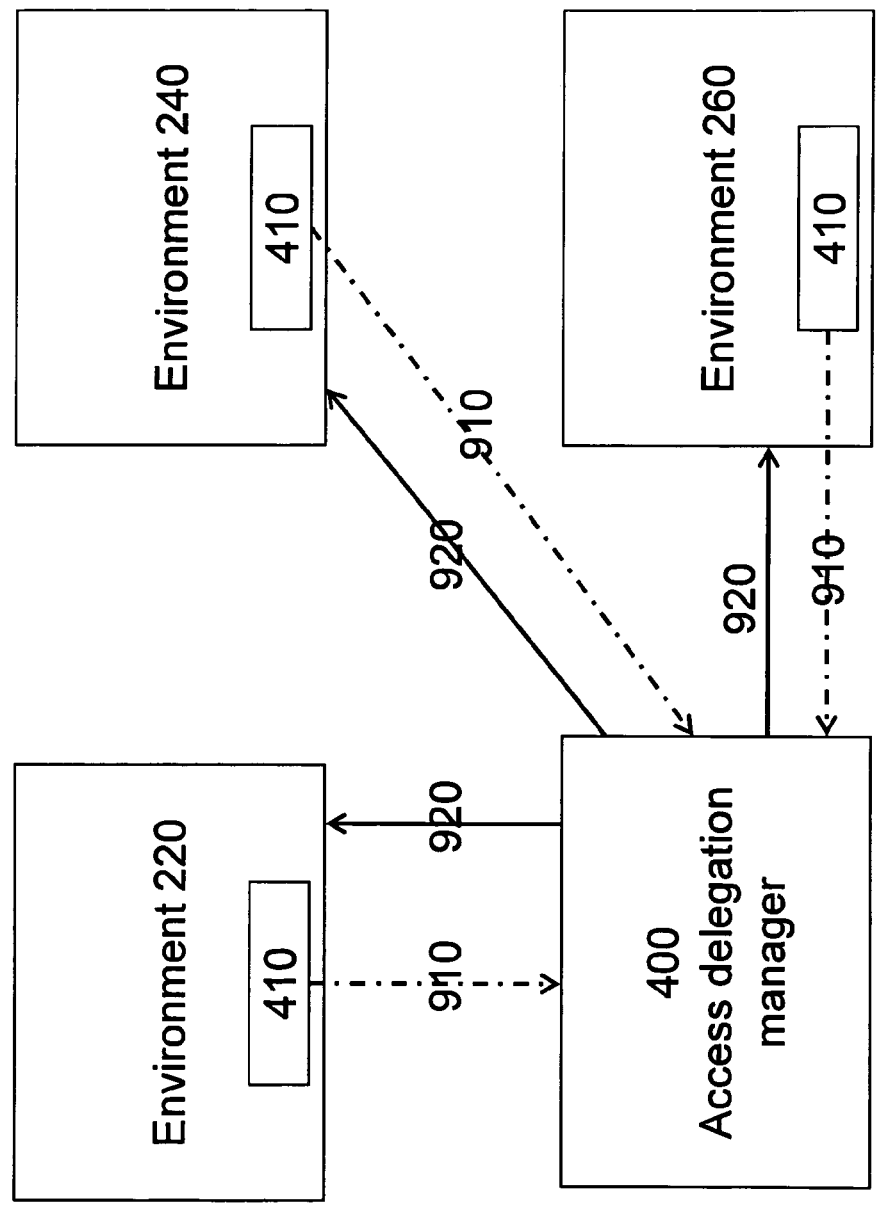
FIG. 4 is a simplified block diagram of multiple computing environments interacting via an access delegation manager, according to a preferred embodiment of the present invention.

Reference is now made to FIG. 4, which is a simplified block diagram of multiple computing environments interacting via an access delegation manager, according to a preferred embodiment of the present invention. Access delegation manager 400 delegates each current operation to the suitable computing environment, so that content or resources are automatically processed in the correct computing environment.

Access delegation manager 400 receives information from agents 410, and monitors user operations. When a user operation 910 is detected (for instance, a file is opened), access delegation manager 400 determines the computing environment on which the operation should be performed, possibly blocking the original operation and requesting another environment to perform the operation 920 (or by substituting a different operation if the original operation cannot be performed in the chosen environment).

Access delegation manager 400 selects the suitable computing environment based on an access policy, which may be based on different criteria for different types of operations. For example, the suitable environment for processing a file may be determined according to the file's name, extension, content, owner, drive type, permissions or any other metadata (including the computer environment in which it was created, its source, etc) that it is tagged with. The environment for network access may be determined according to domain, address format, protocol, access permissions or any other communication characteristics.

Delegated file operations may include, among others, execution and opening methods, and accessing network resources. Within Windows-based environments they may also include shell verb invocation such as double clicking a file, right click, opening files using file dialogs. The file may be transferred to the delegated environment by any method, or accessed via the unified file system if this component is implemented in the system.

Delegated network access may include browsing web sites and accessing any remote or local resource using any protocol.

Figure 5:
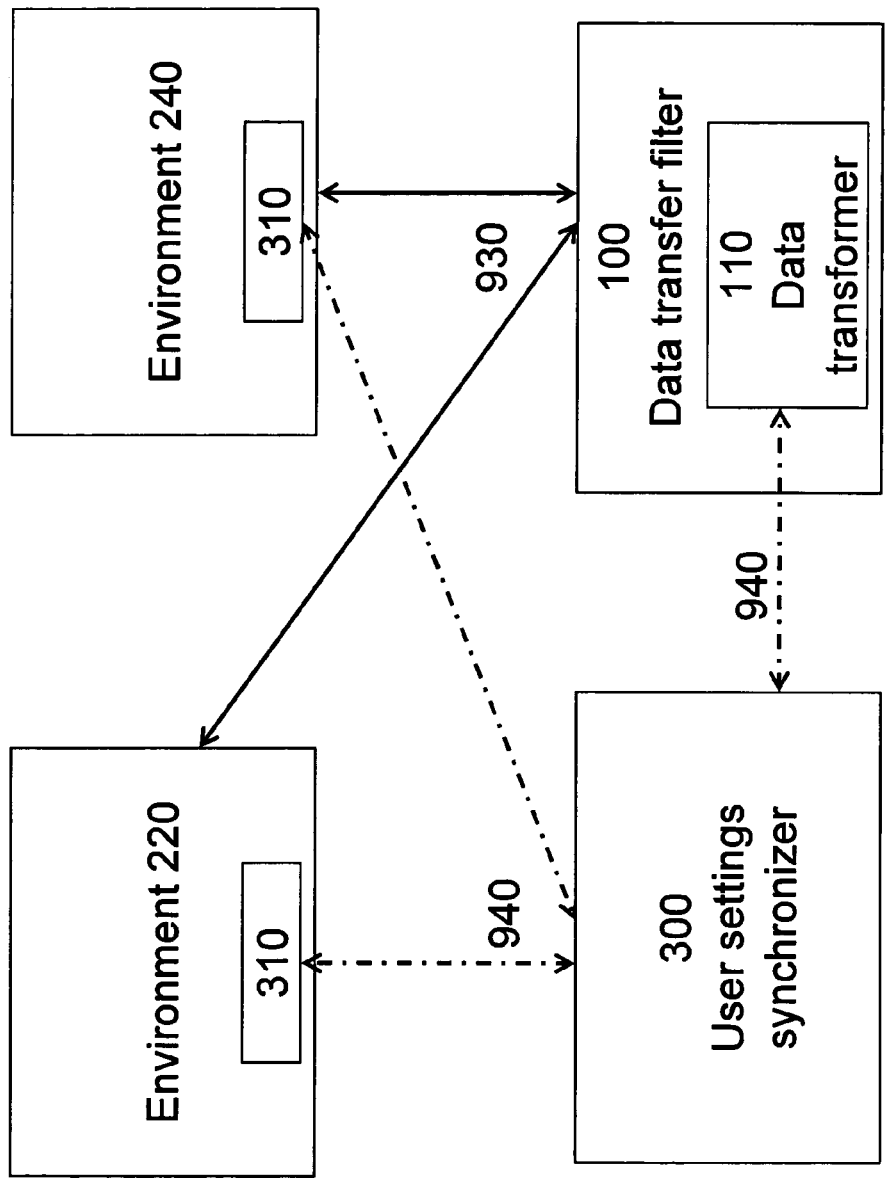
FIG. 5 is a simplified block diagram of multiple computing environments interacting via a data transfer filter and user settings synchronizer, according to a preferred embodiment of the present invention.

Reference is now made to FIG. 5, which is a simplified block diagram of multiple computing environments interacting via a data transfer filter, according to a preferred embodiment of the present invention. Data transfer filter 100 provides policy-based control of data transfer between environments. Each environment 220 and 240 is assigned a data transfer policy that dictates data transfer to and from every other environment, thus providing a specific transfer policy for each possible pair of environments.

Data transfer 930 may be allowed, blocked or require data transformation according to parameters such as: source environment, target environment, data type, data source, data owner, data content, and any metadata that the data was tagged with.

In the preferred embodiment, data transfer filter 100 includes data transformer 110, which transforms data during transfer, in order to comply with the data transfer policy. Transformation may include conversion to another format, excluding, stripping or extracting certain parts of it, encryption/decryption or rebuilding information.

Data transfer filter 100 may be applied for all communication channels between environments 220 and 240, including: copy and paste operations, drag and drop operations, transferring data from or to a device (such as removable media or printer), transferring data obtained over a communication channel which is available on one computing environment and to a different computing environment, file transfer between computing environments using the unified file system, and user settings synchronization (discussed below).

Referring again to FIG. 5, a user settings synchronizer 300 maintains the consistency of the user settings throughout the multiple computing environments, while preventing the distribution of data that might impair the environment isolation. Each computing environment typically has a group of settings 310, which may be different from the equivalent settings in a different computing environment. In order to provide a unified user experience, these settings must be unified (i.e. synchronized and/or combined) into a unified group of settings which apply over all of the computing environments. In the preferred embodiment, the base system settings are used as the basis for unification, and the settings of the other computing environments are synchronized with those of the base system. Alternately, the settings of one of the other computing environments may be used as the basis for unifying settings. Examples of user settings for the Windows operating system are: default printer, default homepage, favorites, location of special folders (such as My Documents and My Pictures), and settings for user applications (such as initials, address book, color schemes, etc.)

Unification of the settings amongst the various computing environments is controlled by the user settings synchronizer 300 according to a synchronization policy. The synchronization policy may be applied at two levels—per-environment and/or per-setting—and may allow the synchronization of settings between any pair of environments, block the synchronization, or allow the synchronization after transforming the settings as required by data transfer filter 100.

Unification methods may include one-way or two-way synchronization between environments 220 and 240, and applying the changes in real-time, upon request or as a scheduled task. Settings unification may also be performed upon the creation or termination of a computing environment.

Figure 6:
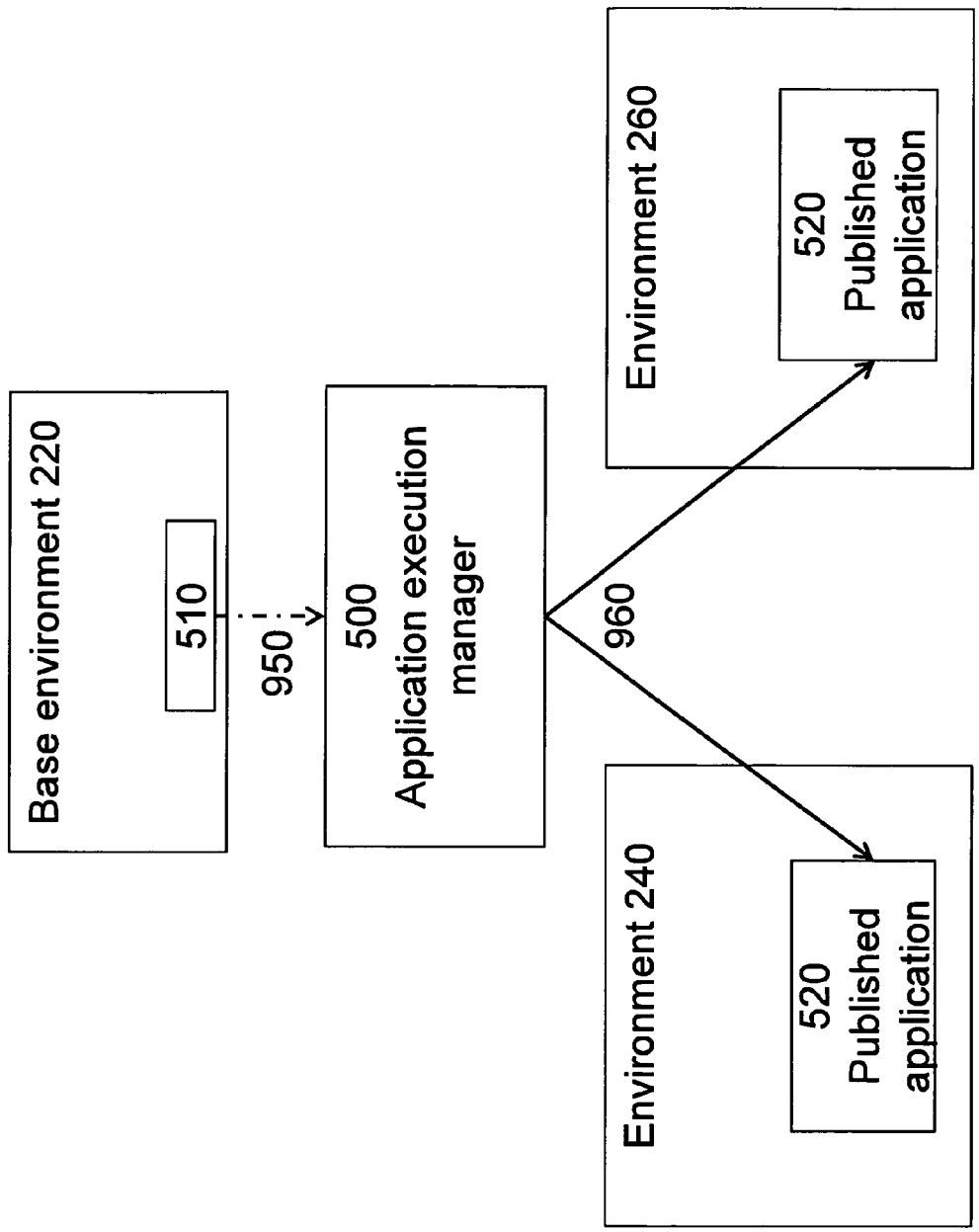
FIG. 6 is a simplified block diagram of multiple computing environments interacting via an application execution manager, according to a preferred embodiment of the present invention.

Reference is now made to FIG. 6, which is a simplified block diagram of multiple computing environments interacting via an application execution manager, according to a preferred embodiment of the present invention. Application execution manager 500 enables a user or administrator to integrate selected applications into the base environment, by enabling the user to trigger the execution of an application 520 which is installed on a different computing environment from the base environment.

In many cases, a user (or administrator) requires that an application installed on one computing environment be available for execution from other computing environment. (An application which is made available to other computing environments is denoted a published application.) In this case, a unique execution command 950 is created by execution manager 500. This command is available on the other computing environment (or selected computing environments). When execution command 950 is used, the published application executes in its residing environment 240 or 260.

The execution command 950 may be triggered in any standard way of execution: using a command line, a shortcut, a bespoke user-interface, or a user menu such as Windows start menu.

The execution command 950 may accept parameters that are transferred to the original published application 520 upon execution. File types may be associated with a published application 520, and files of this type may be processed by the published application even though the application and the file each reside on a different computing environment.

In the preferred embodiment, an administrator publishes the desired applications from each environment to the base environment, thus enabling the user to start these applications using the standard execution methods on the base environment.

Figure 7:
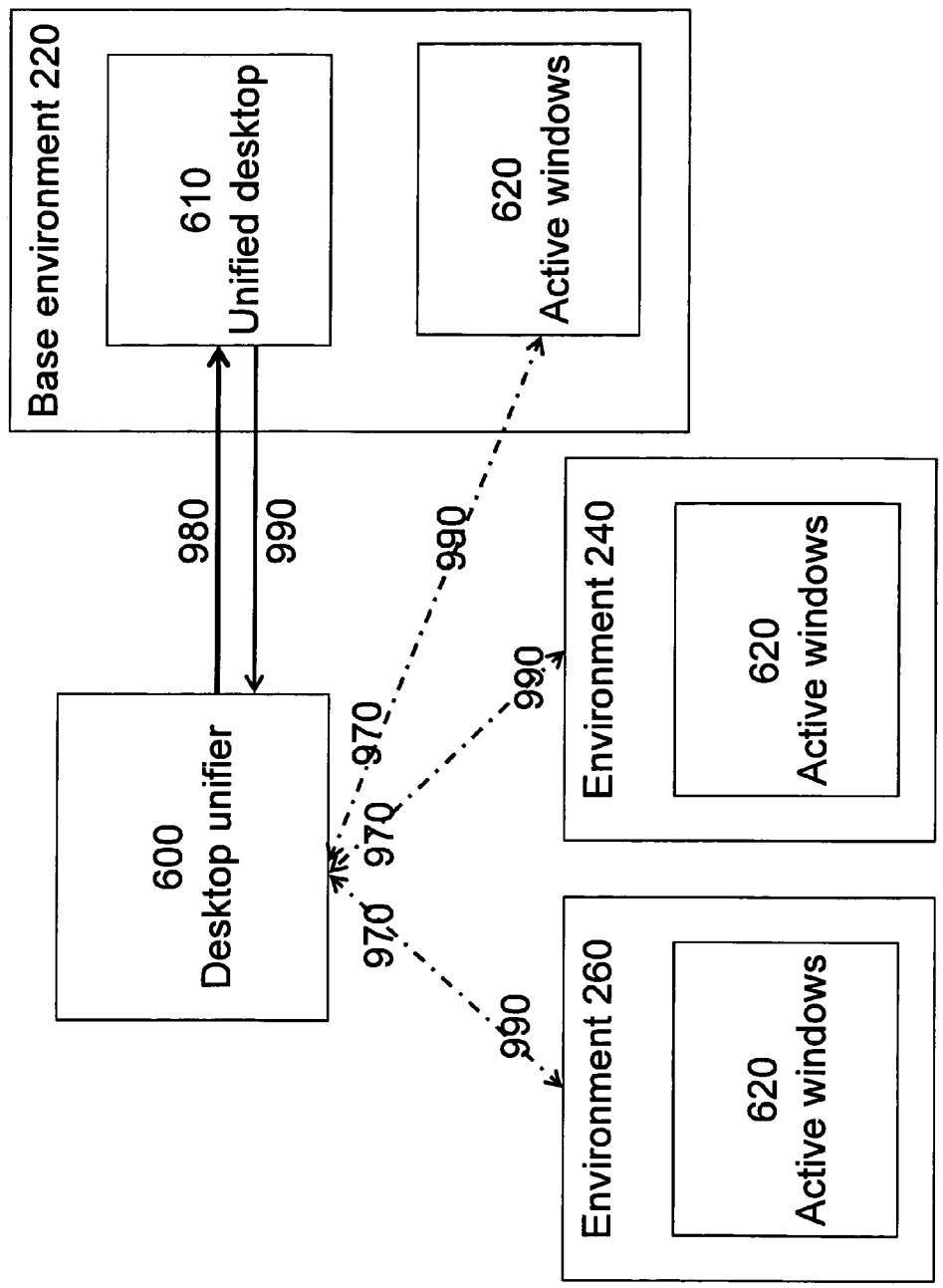
FIG. 7 is a simplified block diagram of multiple computing environments interacting via a desktop unifier, according to a preferred embodiment of the present invention.

Reference is now made to FIG. 7, which is a simplified block diagram of multiple computing environments interacting via a desktop unifier, according to a preferred embodiment of the present invention. Desktop unifier 600 incorporates the user interaction with all active applications 620 in the different computer environments 220, 240 and 260, into the base system's desktop 610 (denoted herein the base desktop). Integration may include seamless windows integration, application control integration and desktop settings and control and/or input integration, as explained below. The base desktop 610 may include desktop aspects such as the taskbar, background image, active display settings, application manager, tray icons, input state (such as num-lock), and others.

The unification process enables the windows of all the computer environments to perform visually as local windows (seamless windows integration). Preferably, all windows in the unified desktop appear in the task bar with icon, title and activity status, and perform actions, such as minimize, maximize, restore and close a window, both when triggered by an application on any computing environment, or as controlled from the window or task bar within the base environment 220.

Operations such as closing a window or keyboard shortcuts (for example alt-tab, win-m, ctrl-shift-esc in t Windows operating system) that take place on the base environment 220 and are presented on the base desktop 610, work as expected from a single desktop (e.g. win-m will minimize all the windows on all computing environments, alt-tab will switch between windows of all computing environments, etc.). Likewise, the user input state (such as num-lock state and caps-lock state) are applied uniformly to all windows, based on the user input state of base environment 220, and are synchronized to the base environment when changed in any one of the environments.

Graphic objects or menus, such as tray icons that are created by applications, appear as if they visually exist on the base desktop 610, and any operation 990 performed on these objects is delegated back to the originating environment 240 or 260. Desktop unifier 600 preferably incorporates the tray icons of other computing environments (and their tool-tip text and icon graphic) into the base environment's tray icon area. Preferably the user interaction all the tray icons (e.g. performing a context menu action or double-clicking) is performed uniformly, regardless of the originating environment of a given icon. Desktop settings, such as the desktop theme, font size and working area, are preferably established by the base environment.

Active applications 620 of environments created by virtual machines on top of a single physical workstation 240 and 260 are preferably visually integrated into base desktop 610. The virtual machine's windows perform visually as local windows (i.e. seamless windows integration). The virtual machine's applications preferably appear in the base desktop's task bar with icon, title and activity status, and perform actions such as minimize, maximize and close when triggered from the original computing environment 240 and 260 or from the window or task bar within the base environment 220.

In order to allow a familiar user experience and better performance when displaying video or highly demanding graphics inside a virtual environment, seamless windows integration is preferably performed in an out-of-band manner. Out-of-band integration occurs without interpreting the environment's graphical data, and relying on the virtualization engine's (e.g. VMWare Player or Microsoft Virtual PC) direct display of the virtual machine desktop on top of the base environment display.

Out-of-band seamless window integration may be implemented by the following method. When a virtual computing environment is started, the virtual machine window is created and updated by the virtualization engine (e.g. VMWare Player or Microsoft Virtual PC) to include the virtual machine's desktop. Desktop unifier 600 does not display the virtual machine desktop by hiding the virtual machine window. Instead, whenever an application window should be displayed on the virtual machine the agent running inside the VM measures the window's area (location, width and height) and sends this meta-data information to the unification supervisor. The unification supervisor in turn displays the virtual machine window to the user, but clips (crops) the original window area to fit only the appropriate area of the application window, and hides the rest of the virtual machine window. The result is that the application is seen on the user display similarly to any other application window running on the user desktop.

When additional windows are to be displayed, the agents of all relevant computing environments similarly send all the windows' area information to the unification supervisor, which in turn extends the clipped area (the area viewable to the user) so as to join of all the windows areas showing only the relevant portions. By applying the same process to several computing environments, the desktops of multiple computing environments are integrated into the base desktop.

In order to support focus and Z-order of windows from different environments (giving the user the illusion of windows that covers other windows and an order between the different windows), the base environment agent may also change the clipping of a virtual machine window according to the z-order of the window; hiding the areas of a windows running in the different environment that should cover the virtual machine window.

In order to provide taskbar button for every application/window that is executed on an environment other than the base desktop, and to support minimizing, maximizing and activation of this window, the concept of a shadow window is presented. For any window that exists inside a computing environment other than the base desktop, a shadow window is preferably created in the base desktop, so that a taskbar entity appears with the correlating icon and text. Any operation done on the shadow window is always reflected in the correlative environment window (e.g. when the shadow window is maximized, minimized, activated, restored or closed the same action is performed on its correlative window and vise versa). This also allows the familiar behavior of general desktop control mechanism such as minimizing all the windows (Win-m key on Microsoft Windows), switching between application (alt+tab key combination in Microsoft Windows), etc.

Graphic objects or menus such as tray icons that are created by applications preferably appear as if they visually exist on the base desktop 610 as well, and any operation performed on them is delegated back to the originating environment 240 or 260.

To support tray icon unification, a similar concept of shadow tray icon is applied. For each tray icon that is presented in an environment other than the base environment, a shadow tray icon is created in the base environment. The shadow tray icon is always synchronized in icon image, tooltip text and state with its correlative tray icon in relevant environment. Any action performed on the shadow tray icon is automatically performed on the original tray icon as well. This includes clicking on the icon, hovering above the icon, double-clicking the icon, right-clicking the icon, hiding the icon, changing the tray icon text or image, and so forth.

Any desktop state or input state that is active on the base desktop is preferably automatically synchronized to all of the other environments (in the case of the Windows operating system this may include num-lock state, caps-lock state, active window property, active screen resolution, active working area, active language, etc.)

Although integrated into base desktop 610, active windows 620 from different environments may be visually differentiated, for instance by a colored frame or icon.

When integrated into one system, the components described above create a unified work environment that is built upon separate computing environments. The unified work environment benefits from the advantages of maintaining the individual computing environment attributes, and the required amount of isolation and security between the computing environments, while maintaining a user experience similar to a single environment system. The user is thus liberated from the need to switch between environments, to understand the inner structure of the system, or to remember which resources, data and applications should be accessed from each environment.

In the preferred embodiment, a management console is used to control and manage the multiple agents and/or unification supervisor, possibly for use by a system administrator.

Figure 8:
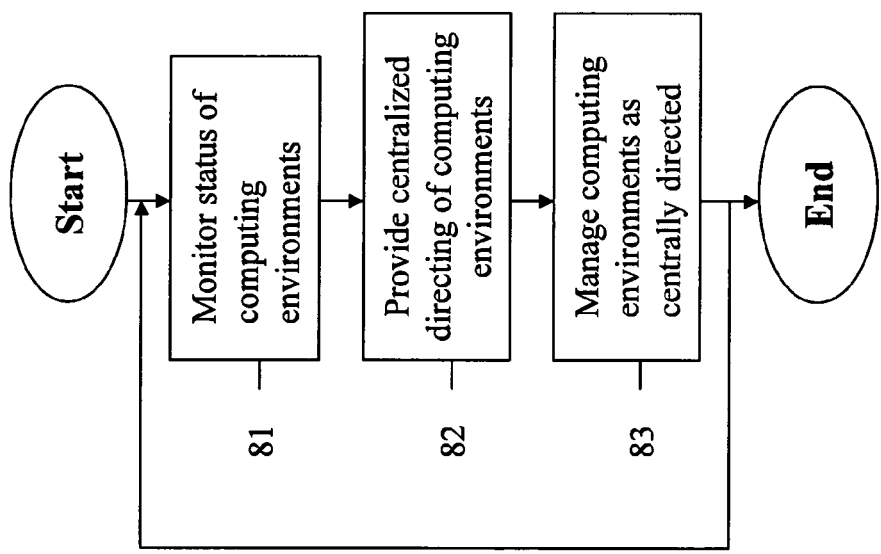
FIG. 8 is a simplified block diagram of a method for integrating multiple computing environments into a unified environment, according to a preferred embodiment of the present invention.

Reference is now made to FIG. 8, which is a simplified block diagram of a method for integrating multiple computing environments into a single unified environment, according to a preferred embodiment of the present invention. The multiple computing environments are available for simultaneous use by a single user, into a unified environment.

In step 81, information received from each of the computing environments is monitored. The information describes the ongoing status of the respective environment. The term status is intended to describe all aspects of the computing environment which are involved in incorporating the other computing environments into the base environment. Such information preferably includes information about current applications, data structures, user operations, settings and so forth. Information about a given computing environment may be provided by an agent installed in the computer environment.

In step 82, centralized direction of the multiple computing environments is performed in accordance with the received information, and with policies designed to provide the user with the unified environment.

Preferably the method further includes managing the computing environments in accordance with the centralized direction (step 83).

This process is performed repeatedly to provide continuous unification and operability of the multiple computing environments into the base environment, thus providing the user with a unified work environment.

The centralized direction may include performing one or more of the following steps:
1. Incorporating the file systems of the other computing environments into the base file system (preferably in accordance with a permissions policy).
2. Delegating operations to a suitable computing environment (preferably selected in accordance with an access policy).
3. Controlling data transfer between the computing environments (preferably in accordance with a data transfer policy).
4. Transforming data being transferred between the computing environments.
5. Maintaining user settings consistency between the computing environments, preferably in accordance with a synchronization policy.
6. Enabling execution of applications from the different computing environments.
7. Integrating the computing environment desktops into the base environment's desktop, thus forming a unified desktop.

Preferably, at least one of the computing environments is a virtual machine.

An additional preferred embodiment of the present invention is an agent which is placed in a computing environment, so as to allow the computing environment to interact with a unification system. The agent includes an information gatherer that gathers information about the ongoing status of the computing environment, and an information provider that outputs the gathered information to the unification system.

It is expected that during the life of this patent many relevant computing environments, operating systems, file systems, computer operations, and applications will be developed and the scope of the corresponding terms is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which, together with the above descriptions, illustrate the invention in a non-limiting fashion.

The following presents two exemplary embodiments. Each embodiment includes a subset of the components described above, to create a system that enables a user to concurrently work on multiple computing environments while transparently integrating them into a unified environment.

Figure 9:
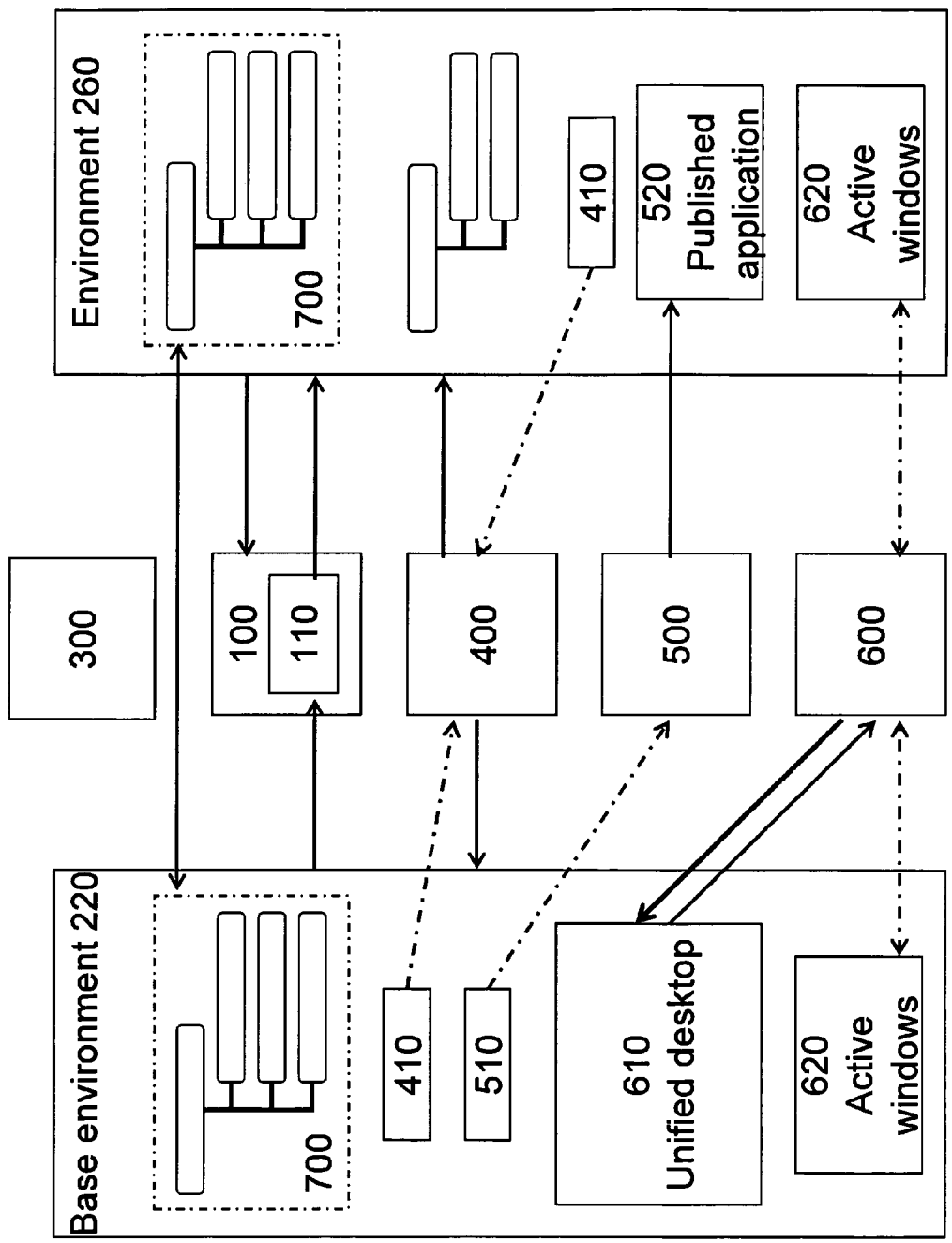
FIG. 9 is a simplified block diagram of an exemplary system that enables a user to access two computing environments.

Reference is now made to FIG. 9, which is a simplified block diagram of an exemplary system that enables a user to access two computing environments, while providing transparent integration between those two environments.

In the present example, two computing environments are defined:
1. Environment A 220 is an instance of operating system assigned to a physical workstation, and serves as the base environment (which provides the base desktop and base file system).

2. Environment B 260 is a virtual environment, for the sake of example created by VMWare Player, running within the same physical workstation as Environment A 220, with another instance of the standard operating system. Environment B 260 is capable of running applications and processing data units. Environment B 260 is a secured and separated environment, and by default no external entity, including Environment A 220, has access to its operating system, data, applications, network or running processes. Environment B 260 thus functions as a separate computing environment.

Environment A 220 serves for day-to-day personal use and unregulated or unclassified business operations, while Environment B 260 serves for accessing one or more defined internal services, applications and/or data, and for performing business oriented tasks that are potentially classified or sensitive.

The creation of Environment B 260 in the described manner could be a result of several business, management or regulatory aspects in order to:
1. Keep Environment B 260 safe from external security threats such as viruses, Trojan horses, and worms.
2. Separate the Internet connectivity available at Environment A 220 from the business operations of Environment B 260.
3. Comply with regulations or contracts which require certain workflows, services or data to be separated from any other user workflow, in order to be kept restricted and audited.

Data transfer filter 100 is applied to control data transfer between the environments, and a data transfer policy is set. For the sake of this example, the data transfer policy for clipboard and drag-and-drop operations between the two environments consists of:
1. Data transfer from Environment A 220 to Environment B 260 is allowed only with transformation to text or bitmap format, to reduce security and malicious code risks to minimum.
2. Data transfer from Environment B 260 to Environment A 220 is forbidden, to avoid leakage of sensitive data.

Printing from Environment B 260 is allowed after a receiving an administrator's confirmation.

Environment A 220 is defined as the base environment for the unified file system 700. From that point onwards, the unified file system 700 is used by Environment B 260 to access, create or override user data units.

According to a data tagging policy, all data units originating from Environment A 220 or one of its accessible resources (whether files, email or any other data unit) are tagged as normal, and all data units originating from Environment B 260 are tagged as sensitive.

Files that were tagged as sensitive are visually differentiated by a lock mark on their file icon, and may also be encrypted by the unified file system 700 when writing them to the base file system in Environment A 220.

A permissions policy is set and enforced by the unified file system 700.

For the sake of this example, the unified file system 700 enables the following:
1. Drive D of Environment B's file system is integrated into Environment A's base file system as a drive D. Thus any access to drive D by an application running on Environment B will be reflected on the corresponding drive D of the base file system on Environment A.
2. Drive C of Environment B's file system is not integrated into the base file system. Thus, any access to drive C by an application running on Environment B will not be reflected on the base file system.
3. Read, write and delete operations which are performed by Environment B 260 on files that have been tagged as normal by the unified file system are subject to permission policies.
4. Any file that is tagged as sensitive (created or changed by Environment B) is encrypted, and is thus inaccessible via Environment A.

The permissions policy ensures that although all files are visible for browsing via both environments 220 and 260, a policy is set to allow reading, writing files that are tagged sensitive only via Environment B 260. Environment A 220 may physically read the files but cannot process them as they are encrypted. On the other hand, Environment B 260 may not read, write, or delete any file that is tagged normal (the unified file system 700 will block such an attempt).

When an attempt is made to process a file, tagged as sensitive, the operation is detected by the access delegation manager 400, and the tag is examined. Access delegation manager 400 then delegates the operation for further processing by Environment B 260.

To make the entire workflow transparent to the user, desktop unifier 600 is applied, and Environment A's 220 desktop is used as the base desktop 610. Any active windows 620 that appear on top of Environment B 260 are detected by the desktop unifier 600 and are visually integrated into Environment A's desktop 610. Environment B's windows thus visually perform as local windows, appear in the task bar with icon, title and activity status, and perform standard windows actions (such as maximize and minimize) when triggered. Any changes made to Environment B's active window are delegated to Environment B 260 and are processed by it. All input, keyboard and mouse states are synchronized between the different environments. All the desktop attributes such as screen resolution, font size and active work area are automatically changed in Environment B 260 to fit Environment A's desktop 610.

Access to the organization's intranet is assigned to Environment B 260 in this example. Hence, when attempting to open a URL or a link to an intranet location, the operation is detected by the access delegation manager 400 and the location of the requested URL is determined as the intranet. The operation is then delegated to a browser residing upon Environment B 260.

Internet access, on the other hand, is allowed via Environment A 220 only, and an attempt to open a URL associated with the Internet will be delegated by the access delegation manager 400 to the browser residing upon the Environment A 220.

Another manner of accessing designated organization applications, for sake of this example a human resources (HR) application 520, is via the application execution manager 500. HR application 520 resides on Environment B 260, and is assigned a unique execution command. When this command is executed by the user using a start menu shortcut, the command is delegated to Environment B 260 for execution of the HR application 520.

In this example, for sake of user convenience, the administrator also creates a shortcut on top of base desktop 610 that triggers execution command. Pressing the shortcut triggers execution of the HR application 520 on top of Environment B 260. Desktop unifier 600 ensures that the active windows of HR application 620 are seamlessly integrated into Environment A's desktop 610, regardless of the fact that the application itself resides on a different environment.

In order to provide a smooth user experience, a user settings synchronizer 300 is applied to ensure that personal settings such as browser favorites, home page, etc. are synchronized between the environments. Although the browsers appear the same, the access policy enforced by access delegation manager 400 allows each environment to access its designated content alone, and the operation is delegated to a different environment when necessary.

A synchronization policy is also applied, preventing the synchronization of settings that might present a security risk to Environment B 260, such as stored passwords and browser auto-complete history. Changes to these settings items on Environment B 260 will therefore not be synchronized with Environment A 220.

Data units that are downloaded from the Internet are tagged as normal. An attempt to copy data into Environment B 260 using the clipboard will trigger the data transfer filter 100. The file tag and format are then examined and compared to the data transfer policy, resulting in a request to transform the data into a text or image format. The transformation is performed by data transformer 110, and the data is copied into Environment B 260 in the transformed format.

To avoid leakage of sensitive data, any attempt to copy data from Environment B 260 to Environment A 220 using the clipboard is detected by the data transfer filter 100, which examines the 'sensitive' tag. The operation is blocked and audited according to the data transfer policy.

In this manner, data transfer between environments is achieved without impairing the security of sensitive environments such as Environment B 260, while providing a smooth user experience which resembles a single unified environment.

Figure 10:
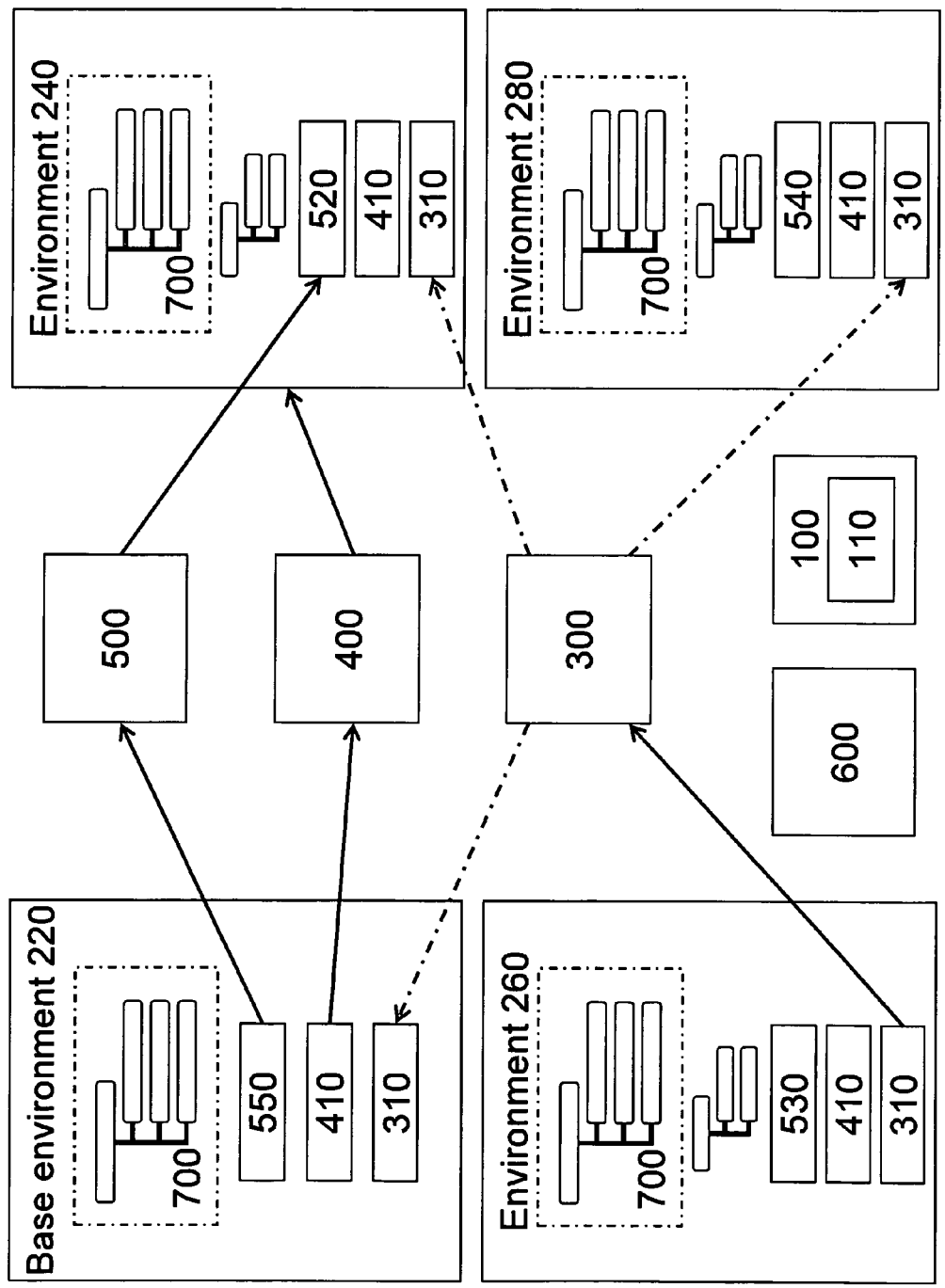
FIG. 10 is a simplified block diagram of an exemplary system that enables a user to seamlessly access four computing environments.

Reference is now made to FIG. 10, which is a simplified block diagram of an exemplary system that enables a user to seamlessly access four computing environments.

For the sake of this example four computing environments are created:

1. Environment A 220 is an instance of operating system assigned to a physical workstation, and running a standard operating system such as Microsoft Windows XP. Environment A serves as the base environment.
2. Environment B 240 is a virtual environment, for the sake of example created by VMWare, within the same physical workstation as Environment A, and running another instance of Microsoft Windows XP.
3. Environment C 260 is a virtual environment, for the sake of example created by Microsoft Virtual PC within the same physical workstation as Environment A, and running an older version of operating system such as Microsoft Windows 98.
4. Environment D 280 is a remote desktop environment, for the sake of example created by Citrix or Terminal Services.

These multiple computing environments may be created in order to solve one or more of the following IT needs, as described in the background section:

1. Simultaneous use of applications that run on different operating systems.
2. Simultaneous use of applications that cannot coexist on the same environment.
3. The need to access legacy environments.
4. Stability
5. IT independence For the sake of this example, the multiple computing environments are assigned the following functions:

1. Environment A 220 is used for day-to-day business use, and for running customer support application A 550 for a first set of clients.
2. Environment B 240 is used for running costumer support application B 520 for a different set of clients. This application shares the same resources with customer support application A 550, yet requires a different version of these resources. It is for this reason that the two applications cannot coexist on the same environment.
3. Environment C 260 is used for running an HR application 530 that is not compatible with operating systems like that of Environment A 220 or B 240, and requires the operating system of environment C 260.
4. Environment D 280 is used to access the organization's central mainframe environment 540.

Environment A 220 is defined as the base environment for the unified file system 700 and desktop unifier 600, as described in the former example.

Since the computing environments are not being separated for security purposes, data transfer between all of the computing environments is allowed. However, since environment C 260 runs an older operating system version, data units in formats that were not supported by Microsoft Windows 98 (such as the latest Microsoft Office version) are transformed into a text or image format by a data transformer 110 prior to being transferred.

Seeing that the separate environments run multiple applications with conflicting requirements, a permissions policy is enforced by the unified file system 700 in order to prevent such applications from sharing file resources such as DLLs or configuration files, thus preventing any conflict between them. This can be done by excluding certain paths or file types from the unified file system 700.

In addition, unified file system 700 separates files created by conflicting applications, even if they have the same file type or extension. To do so, all data units created by a designated application are tagged to indicate the environment in which they were created. The permissions policy enables each environment to read, write and delete only those files that were tagged by its own resident application.

Executing a specific instance of an application, for the sake of this example to service a client supported by customer support application B 520, is performed via application execution manager 500. Application execution manager 500 creates a unique execution command as described in the former example. Links are then created to each instance of the designated application 520 within the desktop base environment (in this case Environment A 220). These links may be placed on the base environment's desktop, start menu and/or within a tray icon menu.

When the user attempts to access a data unit, the processing is delegated to the correct environment by the access delegation manager 400.

For the sake of this example, a data unit that is created by customer support application B 520 is tagged (or has a unique file extension). Hence an attempt to access the data unit triggers access delegation manager 400. The processing environment will be determined as Environment B 240 on which customer support application B 520 resides, and the operation will be delegated to it.

A user settings synchronizer 300 is also applied, maintaining settings consistency between environments. For example, a change to the default printer via environment C 260 is detected by the user settings synchronizer 300 and compared to the synchronization policy. For the sake of this example, no security restrictions are applied to user settings, and therefore the synchronization is allowed and the change is made to the default printer of all other environments 220, 240 and 280.

The above-described embodiments enable the creation of computing environments capable of running multiple instances of operating systems and applications, while providing a user experience which resembles working in a single unified environment.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system integrating a first, second, and third computing environment, the first, second, and third computing environments each comprising an operating system, the first, second, and third computing environments being available for simultaneous use by a single user, and the first computing environment supervising unification with the second and third computing environments, comprising:
   a computing device comprising a memory, the memory bearing computer-readable instructions that, when executed on the computing device, cause the computing device to at least:
      receive, by the second computing environment, user input indicative of changing a setting in the second computing environment;
      change the setting in the second computing environment in response to the user input;
      send, by the second computing environment, an indication to the first computing environment to change the setting in the first computing environment in response to changing the setting in the second computing environment;
      change, by the first computing environment, the setting in the first computing environment in response to receiving the indication from the second computing environment and in response to determining that two-way setting synchronization is set for the second computing environment;
      send, by the first computing environment, an indication to the third computing environment to change the setting in the third computing environment upon the creation of the third computing environment and in response to changing the setting in the first computing environment;
      change, by the third computing environment, the setting in the third computing environment in response to receiving the indication to the third computing environment;
      send, by the first computing environment, an indication to the second computing environment to change a second setting in response to changing the second setting in the first computing environment;
      change, by the second computing environment, the setting in the second computing environment in response to receiving the indication to change the second setting;
      receive, by the first computing environment, an indication to change a third setting from the third computing environment;
      determine, by the first computing environment, not to make the third setting change in response to determining that one-way setting synchronization is set for the third computing environment.

2. The system of claim 1, wherein the second computing environment comprises:
   a virtual machine.

3. The system of claim 1, wherein the first computing environment comprises a user host environment and the second computing environment comprises:
   a virtual environment running on top of the user host environment.

4. The system of claim 1, wherein at least one of said computing environments comprises a remote desktop.

5. The system of claim 1, wherein the first computing environment executes a first operating system, and the second computing environment executes a second operating system, the first operating system being a different version or type than the second operating system.

6. The system of claim 1, wherein the second computing environment comprises:
   an agent that receives the indication from the first computing environment, and changes the setting in the second computing environment in response to receiving the indication.

7. The system of claim 1, wherein the memory further bears computer-readable instructions that, when executed on the computing device, cause the computing device to at least:
   receive, by the first computing environment, a request from the third computing environment to access data of the second computing environment;
   tag the data with tag comprising an identifier of a computing environment on which the data was created or last modified, or an external source of the data;
   determine, by the first computing environment, based on the identifier of the second computing environment, to allow the third computer to access the data; and
   allow, by the first computing environment, the third computing environment to access the data.

8. The system of claim 1, wherein the memory further bears computer-readable instructions that, when executed on the computing device, cause the computing device to at least:
   incorporate, by the first computing environment, a second file system of the second computing environment into a first file system of the first computing environment;
   receive, by the first computing environment, a request from the third computing environment to access a file of the first file system;
   determine, by the first computing environment, that the requested file is a file of the second file system; and
   permit, by the first computing environment, the third computing environment to access the requested file.

9. The system of claim 8, wherein the computer-readable instructions that, when executed on the computing device, cause the computing device to at least permit, by the first computing environment, the third computing environment to read or write the requested file further cause the computing device to at least:

determine, by the first computing environment, that the third computing environment has permission to access the requested file.

10. The system of claim 9, wherein the computer-readable instructions that, when executed on the computing device, cause the computing device to at least permit, by the first computing environment, the third computing environment to read or write the requested file further cause the computing device to at least:

convert, by the first computing environment; the requested file from a first file type to a second file type; and permit, by the first computing environment, the third computing environment to access the requested file in the second file type.

11. The system of claim 9, wherein the computer-readable instructions that, when executed on the computing device, cause the computing device to at least determine, by the first computing environment, that the third computing environment has permission to access the requested file further cause the computing device to at least:

determine that the third computing environment has permission to access the requested file based on a file type of the requested file, a folder of the requested file, a drive type of the requested file, a path of the requested file, a user of the requested file, an environment the requested file was created in, an environment the requested file was last modified in, or a tag of the requested file.

12. The system of claim 1, wherein the memory further bears computer-readable instructions that, when executed on the computing device, cause the computing device to at least:

receive, by the first computing environment, second user input indicative of an operation;

determine, by the first computing environment, to delegate the operation to the second computing environment; and send, by the first computing environment, a second indication to the second computing environment to perform the operation, such that the second computing environment performs the operation in response to receiving the second indication.

13. The system of claim 12, wherein the computer-readable instructions that, when executed on the computing device, cause the computing device to at least determine, by the first computing environment, to delegate the operation to the second computing environment further cause the computing device to at least:

determine to delegate the operation in accordance with an access policy.

14. The system of claim 12, wherein the memory further bears computer-readable instructions that, when executed on the computing device, cause the computing device to at least:

receive, by the first computing environment, third user input indicative of a second operation to be performed in the second computing environment;

determine, by the first computing environment, that the second computing environment is unsuitable to perform the second operation; and prevent, by the first computing environment, the second operation from being performed in the second computing environment.

15. The system of claim 12, wherein the computer-readable instructions that, when executed on the computing device, cause the computing device to at least determine, by the first computing environment, to delegate the operation to the second computing environment further cause the computing device to at least:

determine to delegate the operation based on a file name of a file corresponding to the operation, a file extension of a file corresponding to the operation, a file content of a file corresponding to the operation, a file owner of a file corresponding to the operation, a drive type of a file corresponding to the operation, a file type of a file corresponding to the operation, an access permissions of a file corresponding to the operation, or a tag of a file corresponding to the operation.

16. The system of claim 12, wherein the operation comprises:

a web access operation; and wherein the computer-readable instructions that, when executed on the computing device, cause the computing device to at least determine, by the first computing environment, to delegate the operation to the second computing environment further cause the computing device to at least:

determine to delegate the operation based on a domain, an address format, a protocol, an access permissions, a tag, or a communication characteristic of the operation.

17. The system of claim 1, wherein the memory further bears computer-readable instructions that, when executed on the computing device, cause the computing device to at least:

receive, by the first computing environment, second user input indicative of transferring data from the second computing environment to the third computing environment;

determine, by the first computing environment, to transfer the data in accordance with a data transfer policy; and transfer, by the first computing environment, the data from the second computing environment to the third computing environment in accordance with the data transfer policy.

18. The system of claim 17, wherein the computer-readable instructions that, when executed on the computing device, cause the computing device to at least transfer, by the first computing environment, the data from the second computing environment to the third computing environment in accordance with the data transfer policy further cause the computing device to at least:

transform the data from a first data type to a second data type before transferring the data.

19. The system of claim 17, wherein the computer-readable instructions that, when executed on the computing device, cause the computing device to at least transfer, by the first computing environment, the data from the second computing environment to the third computing environment in accordance with the data transfer policy further cause the computing device to at least:

perform a copy operation, a paste operation, a drag and drop operation, a printing operation, or a user settings synchronization.

20. The system of claim 17, further comprising:

transforming the data from a first data type to a second data type before transferring the data.

21. The system of claim 17, wherein the memory further bears computer-readable instructions that, when executed on the computing device, cause the computing device to at least:

receive, by the first computing environment, third user input indicative of transferring second data from the second computing environment to the third computing environment;

determine, by the first computing environment, to block transferring the second data in accordance with the data transfer policy; and block, by the first computing environment, transferring the second data in accordance with the data transfer policy.

22. The system of claim 1, wherein the computer-readable instructions that, when executed on the computing device, cause the computing device to at least send, by the first computing environment, an indication to change the setting in the second computing environment, such that the second computing environment changes the setting in the second computing environment in response to receiving the indication further cause the computing device to at least:

send an indication to change the setting on a per-environment basis.

23. The system of claim 1, wherein the computer-readable instructions that, when executed on the computing device, cause the computing device to at least send, by the first computing environment, an indication to change the setting in the second computing environment, such that the second computing environment changes the setting in the second computing environment in response to receiving the indication further cause the computing device to at least:

send an indication to change the setting on a per-setting basis.

24. The system of claim 1, wherein the memory further bears computer-readable instructions that, when executed on the computing device, cause the computing device to at least:

receive, at the base computing environment, second user input at an application icon of the first computing environment indicative of executing an application corresponding to the application icon;

send, by the base computing environment, an indication to the second computing environment indicative of executing the application; and execute, the second computing environment, the application.

25. The system of claim 1, wherein the memory further bears computer-readable instructions that, when executed on the computing device, cause the computing device to at least:

receive, by the base computing environment, an indication of a second desktop of the second computing environment; and display, by the base computing environment, the second desktop incorporated with a first desktop of the first computing environment.

26. The system of claim 25, wherein the computer-readable instructions that, when executed on the computing device, cause the computing device to at least display, by the base computing environment, the second desktop incorporated with a first desktop of the first computing environment further cause the computing device to at least:

combine a first active window of the first desktop and a second active window of the second desktop into an integrated visual image.

27. The system of claim 26, wherein the computer-readable instructions that, when executed on the computing device, cause the computing device to at least combine a first active window of the first desktop and a second active window of the second desktop into an integrated visual image further cause the computing device to at least:

combine the first active window and the second active window out of band.

28. The system of claim 25, wherein the memory further bears computer-readable instructions that, when executed on the computing device, cause the computing device to at least:

combine a second taskbar of the second desktop into a first taskbar of the first desktop.

29. The system of claim 25, wherein the computer-readable instructions that, when executed on the computing device, cause the computing device to at least display, by the base computing environment, the second desktop incorporated with a first desktop of the first computing environment image further cause the computing device to at least:

display a tray icon of the first desktop and a tray icon of the second desktop in a tray icons area of the first computing environment.

30. A method for integrating a first, second, and third computing environment, the first, second, and third computing environments each comprising an operating system, the first, second, and third computing environments being available for simultaneous use by a single user, and the first computing environment supervising unification with the second and third computing environments, comprising:

receiving, by the first computing environment, user input indicative of changing a setting in the first computing environment;

changing the setting in the first computing environment in response to the user input;

sending, by the first computing environment, an indication to the second computing environment to change the setting in the second computing environment in response to changing the setting in the first computing environment;

changing, by the second computing environment, the setting in the second computing environment in response to receiving the indication;

sending, by the first computing environment, an indication to the third computing environment to change the setting in the third computing environment in response to determining that the third computing environment has been created, and after changing the setting in the first computing environment;

changing, by the third computing environment, the setting in the third computing environment in response to receiving the indication;

sending, by the second computing environment, an indication to the first computing environment to change a second setting in response to changing the second setting in the second computing environment;

changing, by the first computing environment, the setting in the first computing environment in response to receiving the indication to change the second setting and in response to determining that two-way setting synchronization is set for the second computing environment;

receiving, by the first computing environment, an indication to change a third setting from the third computing environment; and determining, by the first computing environment, not to make the third setting change in response to determining that one-way synchronization is set for the third computing environment.

31. The method of claim 30, wherein the second computing environment comprises:

a virtual machine.

32. The method of claim 30, wherein the first computing environment comprises a user host environment and the second computing environment comprises:

a virtual environment running on top of the user host environment.

33. The method of claim 30, further comprising:
incorporating, by the first computing environment, a second file system of the second computing environment into a first file system of the first computing environment;
receiving, by the first computing environment, a request from the third computing environment to access a file of the first file system;
determining, by the first computing environment, that the requested file is a file of the second file system; and
permitting, by the first computing environment, the third computing environment to access the requested file.

34. The method of claim 30, further comprising:
receiving, by the first computing environment, second user input indicative of an operation;
determining, by the first computing environment, to delegate the operation to the second computing environment; and
sending, by the first computing environment, a second indication to the second computing environment to perform the operation, such that the second computing environment performs the operation in response to receiving the second indication.

35. The method of claim 30, further comprising:
receiving, by the first computing environment, second user input indicative of transferring data from the second computing environment to a third computing environment;
determining, by the first computing environment, to transfer the data in accordance with a data transfer policy; and
transferring, by the first computing environment, the data from the second computing environment to the third computing environment in accordance with the data transfer policy.

36. The method of claim 30, further comprising:
receiving, at the base computing environment, second user input at an application icon of the first computing environment indicative of executing an application corresponding to the application icon;
sending, by the base computing environment, an indication to the second computing environment indicative of executing the application; and
executing, the second computing environment, the application.

37. The method of claim 30, further comprising:
receiving, by the base computing environment, an indication of a second desktop of the second computing environment; and
displaying, by the base computing environment, the second desktop incorporated with a first desktop of the first computing environment.

38. A computer-readable storage medium excluding signals for integrating a first, second, and third computing environment, the first, second, and third computing environments each comprising an operating system, the first, second, and third computing environments being available for simultaneous use by a single user, and the first computing environment supervising unification with the second and third computing environments, bearing computer-readable instructions that, upon execution by a computer, cause the computer to perform operations comprising:
receiving, by the first computing environment, user input indicative of changing a setting in the first computing environment;
changing the setting in the first computing environment in response to the user input; and
sending, by the first computing environment, an indication to the second computing environment to change the setting in the second computing environment in response to changing the setting in the first computing environment;
changing, by the second computing environment, the setting in the second computing environment in response to receiving the indication;
sending, by the first computing environment, an indication to the third computing environment to change the setting in the third computing environment in response to determining that the third computing environment has been created after changing the setting in the first computing environment;
changing, by the third computing environment, the setting in the third computing environment in response to receiving the indication;
sending, by the second computing environment, an indication to the first computing environment to change a second setting in response to changing the second setting in the second computing environment;
changing, by the first computing environment, the setting in the first computing environment in response to receiving the indication to change the second setting and in response to determining that two-way setting synchronization is set for the second computing environment;
receiving, by the first computing environment, an indication to change a third setting from the third computing environment; and
determining, by the first computing environment, not to make the third setting change in response to determining that one-way synchronization is set for the third computing environment.

* * * * *